US010882381B2

(12) United States Patent
Klock et al.

(10) Patent No.: US 10,882,381 B2
(45) Date of Patent: *Jan. 5, 2021

(54) VEHICLE AND WINDSHIELD FOR ATTACHMENT TO A VEHICLE

(71) Applicant: Kustom Cycles, Inc., Mitchell, SD (US)

(72) Inventors: Brian R. Klock, Mitchell, SD (US); Daniel R. Cheeseman, Mitchell, SD (US); Logan S. Homstad, Fargo, ND (US); Jennifer N. Bainbridge, Mitchell, SD (US); Jason P. Hanson, Alexandria, SD (US); Randall J. Rothlisberger, Mitchell, SD (US)

(73) Assignee: Kustom Cycles, Inc., Mitchell, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,952

(22) Filed: Nov. 6, 2018

(65) Prior Publication Data

US 2019/0135087 A1    May 9, 2019

Related U.S. Application Data

(63) Continuation of application No. 15/619,105, filed on Jun. 9, 2017, now Pat. No. 10,118,468.

(51) Int. Cl.
*B60J 1/00* (2006.01)
*B60J 1/02* (2006.01)

(52) U.S. Cl.
CPC ............... *B60J 1/008* (2013.01); *B60J 1/004* (2013.01); *B60J 1/02* (2013.01)

(58) Field of Classification Search
CPC .................................... B60J 1/008; B60J 1/02
USPC .................................. 296/84.1, 90, 91, 78.1
See application file for complete search history.

(56) References Cited

U.S. PATENT DOCUMENTS

| | | | | |
|---|---|---|---|---|
| 4,448,278 A | * | 5/1984 | Badsey | B62D 61/065 180/210 |
| D283,811 S | * | 5/1986 | Sullivan | D12/182 |
| D334,374 S | * | 3/1993 | Hornai | D12/182 |
| 5,845,955 A | * | 12/1998 | Willey | B62J 17/04 296/78.1 |
| 6,663,158 B1 | * | 12/2003 | Showalter | B60J 1/02 296/96.21 |
| 6,679,537 B1 | * | 1/2004 | Putnam, Jr. | B62J 17/04 211/18 |
| 6,736,441 B1 | * | 5/2004 | Barber | B62J 17/04 248/549 |
| 7,032,915 B2 | * | 4/2006 | Bedard | B62J 17/04 280/288.4 |
| D586,274 S | * | 2/2009 | Klock | D12/182 |
| D586,275 S | * | 2/2009 | Klock | D12/182 |
| D626,046 S | * | 10/2010 | Klock | D12/182 |
| D633,018 S | * | 2/2011 | Klock | D12/182 |
| 8,888,163 B1 | * | 11/2014 | Johnson | B60J 1/20 296/77.1 |

(Continued)

*Primary Examiner* — Jason S Morrow
(74) *Attorney, Agent, or Firm* — Ice Miller LLP

(57) ABSTRACT

A windshield and a vehicle having a windshield are provided. The windshield includes a right-side bulging portion disposed at a right-side lower portion, a left-side bulging portion disposed at a left-side lower portion, and at least one protrusion disposed at an upper edge.

19 Claims, 6 Drawing Sheets

(56) References Cited

U.S. PATENT DOCUMENTS

| | | | | |
|---|---|---|---|---|
| 8,936,163 B2* | 1/2015 | Fleischer | ............ | H05K 5/0204 |
| | | | | 211/186 |
| 8,936,296 B1* | 1/2015 | Fedders | .................... | B60J 1/06 |
| | | | | 296/190.1 |
| 10,118,468 B1* | 11/2018 | Klock | ...................... | B60J 1/008 |
| 2005/0200153 A1* | 9/2005 | Khan | ...................... | B62J 17/02 |
| | | | | 296/78.1 |
| 2008/0061579 A1* | 3/2008 | Willey | .................... | B62J 17/04 |
| | | | | 296/78.1 |
| 2012/0074282 A1* | 3/2012 | Willey | .................... | B60J 1/004 |
| | | | | 248/226.11 |
| 2012/0248812 A1* | 10/2012 | Fukuda | .................. | B62J 17/04 |
| | | | | 296/78.1 |
| 2013/0106132 A1* | 5/2013 | Daniel | .................... | B62J 17/04 |
| | | | | 296/78.1 |
| 2014/0048347 A1* | 2/2014 | Munzel | .................. | B62J 17/04 |
| | | | | 180/219 |
| 2014/0167441 A1* | 6/2014 | Shope | .................... | B62J 17/04 |
| | | | | 296/84.1 |

* cited by examiner

VEHICLE AND WINDSHIELD FOR ATTACHMENT TO A VEHICLE

RELATED APPLICATION DATA

This application is a continuation of U.S. application Ser. No. 15/619,105, filed Jun. 9, 2017, now U.S. Pat. No. 10,118,468, which is hereby incorporated in its entirety herein by reference.

BACKGROUND

Operators and/or passengers of vehicles, such as utility task vehicles (UTVs), all-terrain vehicles (ATVs), and/or similar vehicles, often travel through environments having elements that adversely affect the experience of the operator and/or passenger and/or adversely impact the ability for the operator and/or passenger to perform desired tasks, including operating the vehicle. For example, a vehicle may travel through rain, snow, and/or other precipitation that may reduce the visibility of the operator and/or passenger. Further, airflow, flying insects, sand, mud, and/or debris flow at significant velocity into or through the vehicle to cause significant discomfort, strain on the eyes, neck, and/or other body parts, distractions for the operator and/or passenger, and/or even injury upon impact with the operator and/or passenger.

However, it is highly desirable for many types of vehicles to include an open front area to maintain a high level of operator and passenger visibility and to allow access through the front portion of the vehicle passenger compartment. A conventional windshield covering the front portion of a vehicle passenger compartment may quickly become covered by mud, debris, and other objects, and the design and durable and utilitarian nature of many vehicles, such as UTVs, does not find such vehicles being equipped with accessories such as windshield wipers to clear such debris from the conventional windshield.

Therefore, there exists a need for a windshield and vehicle having a windshield that improve the operation and experience of the operator and/or passenger of the vehicle while traveling without significantly impacting the visibility and functioning of the operator and/or passenger.

SUMMARY

In accordance with an embodiment of the present disclosure, a windshield for attachment to a vehicle is provided. The windshield includes a right-side bulging portion disposed at a right-side lower portion, a left-side bulging portion disposed at a left-side lower portion, and at least one protrusion disposed at an upper edge.

In accordance with an embodiment of the present disclosure, a windshield for attachment to a vehicle is provided. The windshield includes a line of symmetry defining a right side and a left side, a right-side depression extending from a lower portion of the line of symmetry to a right side of an upper edge, and a left-side depression extending from the lower portion of the line of symmetry to a left side of the upper edge.

In accordance with an embodiment of the present disclosure, a vehicle is provided. The vehicle includes a windshield having a right-side depression extending from a lower-central portion to a right side of an upper edge, a left-side depression extending from the lower-central portion to a left side of the upper edge, and at least one fastener disposed at at least one edge of the windshield and configured to attach the windshield to the vehicle.

BRIEF DESCRIPTION OF THE FIGURES

The embodiments described herein and other features, advantages, and disclosures contained herein, and the manner of attaining them, will be better understood from the following description in conjunction with the accompanying drawing figures, in which like reference numerals identify like elements, and wherein.

DETAILED DESCRIPTION

In the following detailed description of embodiments of the present disclosure, reference is made to the accompanying drawings that form a part hereof, and in which is shown by way of illustration, and not by way of limitation, such specific embodiments. It is to be understood that other embodiments may be utilized and that changes may be made without departing from the spirit and scope of the present disclosure.

Figure 1:
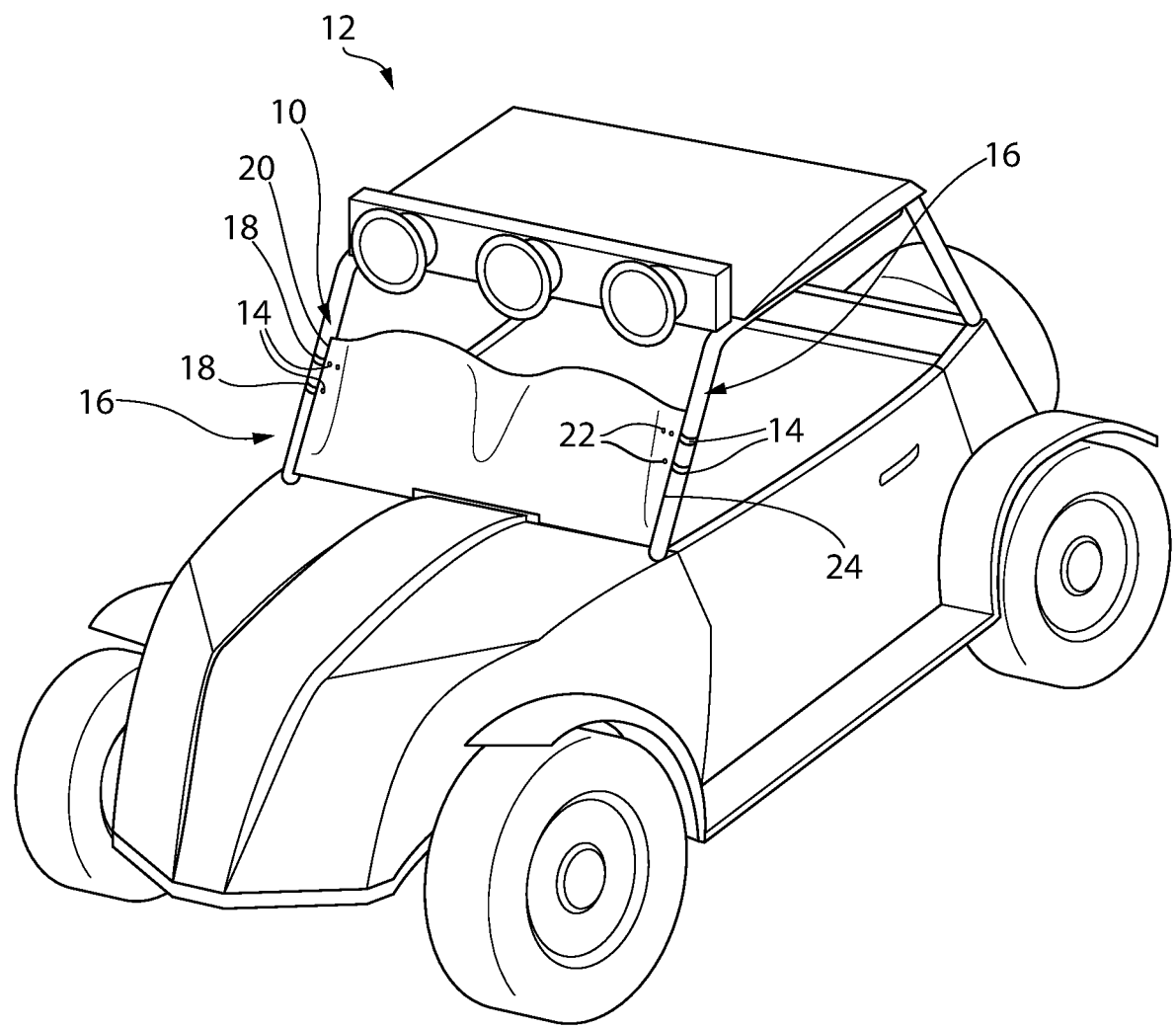
FIG. 1 illustrates a vehicle in accordance with aspects of the present disclosure.

Referring now to FIG. 1, a vehicle 12 having a vehicle windshield 10 is illustrated in accordance with an embodiment of the present disclosure. The vehicle 12 of the illustrated embodiment is a utility task vehicle (UTV). In one or more embodiments not illustrated, the vehicle 12 is a car, a truck, an all-terrain vehicle (ATV), a tractor, a golf cart, or any other wheeled vehicle, an aircraft, a watercraft, or another vehicle configured to transport one or more people. The vehicle 12 further includes one or more fastener(s) 14 disposed at one or more edge(s) 16 of the windshield 10 and configured to attach the windshield 10 to the vehicle 12. In additional embodiments not illustrated, the fastener(s) 14 is/are integral with the windshield 10 and/or the vehicle 12. The fastener(s) 14 include one or more quick release fasteners, clips, clamps, screws, bolts, and/or fasteners removable without the use of tools in one or more embodiments. The windshield 10 includes, in one or more embodiments, one or more right-side attachment portion(s) 18 disposed at a right-side edge 20 and configured to attach the windshield 10 to the vehicle 12 and one or more left-side attachment portion(s) 22 disposed at a left-side edge 24 and configured to attach the windshield 10 to the vehicle 12.

Although not illustrated, the windshield 10 and/or vehicle 12 of one or more embodiments includes one or more light(s), mirror(s), turn signal(s), trim piece(s), molding(s), and/or other items or accessories attached to and/or formed integrally with the windshield 10 and/or the vehicle 10.

Figure 2:
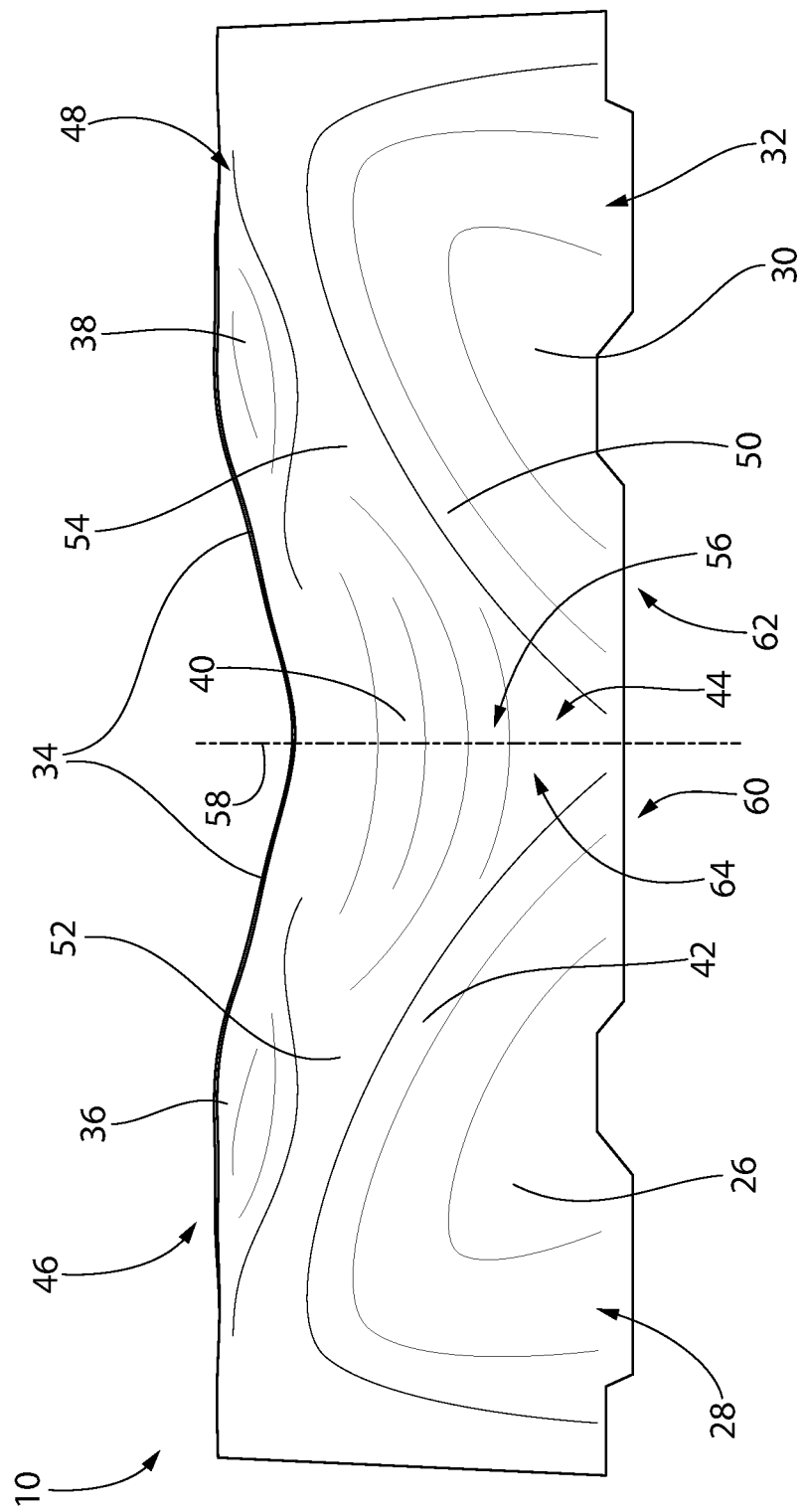
FIG. 2 is a top plan view of a vehicle windshield in accordance with aspects of the present disclosure.
Figure 3:
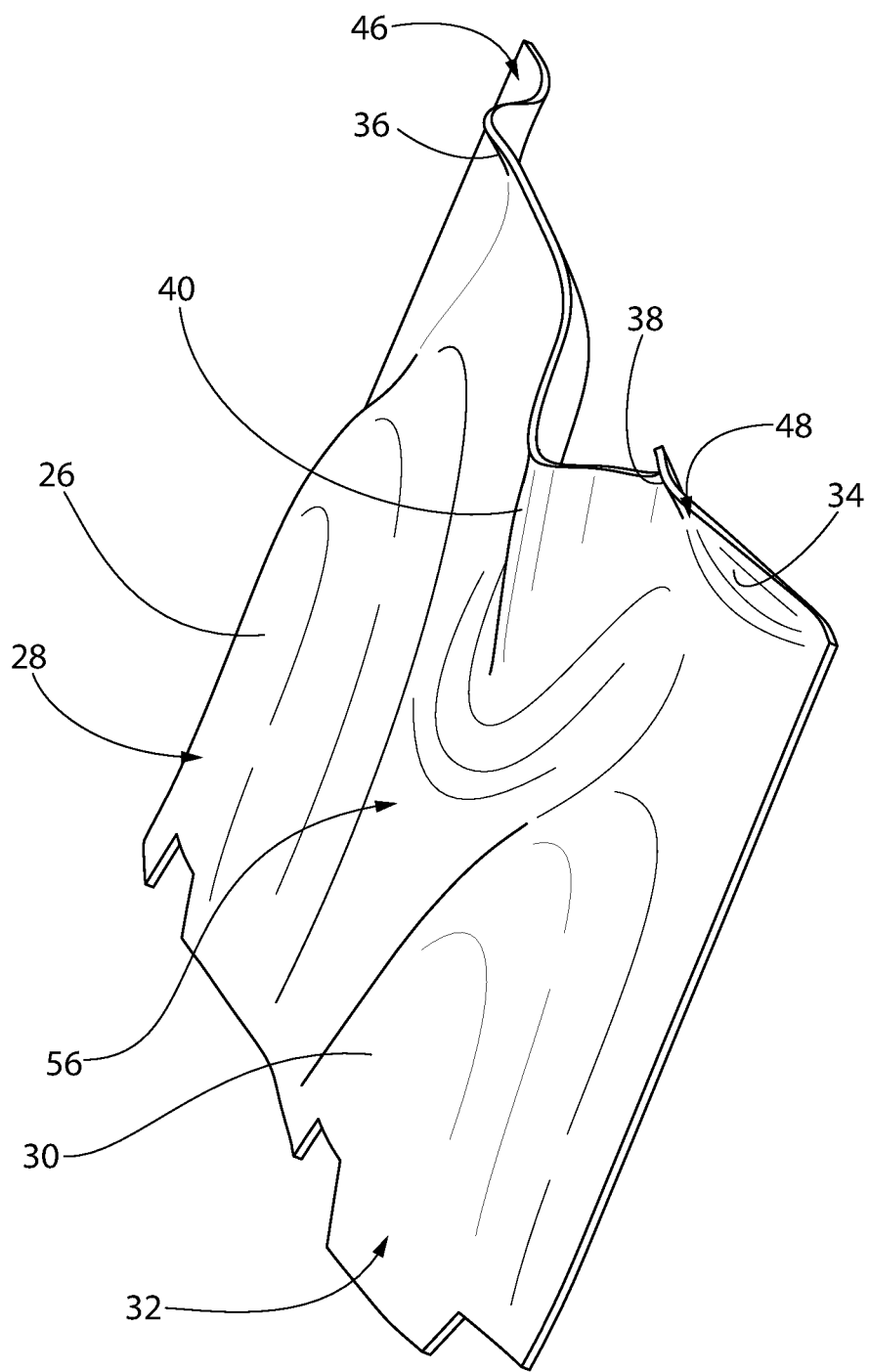
FIG. 3 is a side perspective view of a vehicle windshield in accordance with aspects of the present disclosure.
Figure 4:
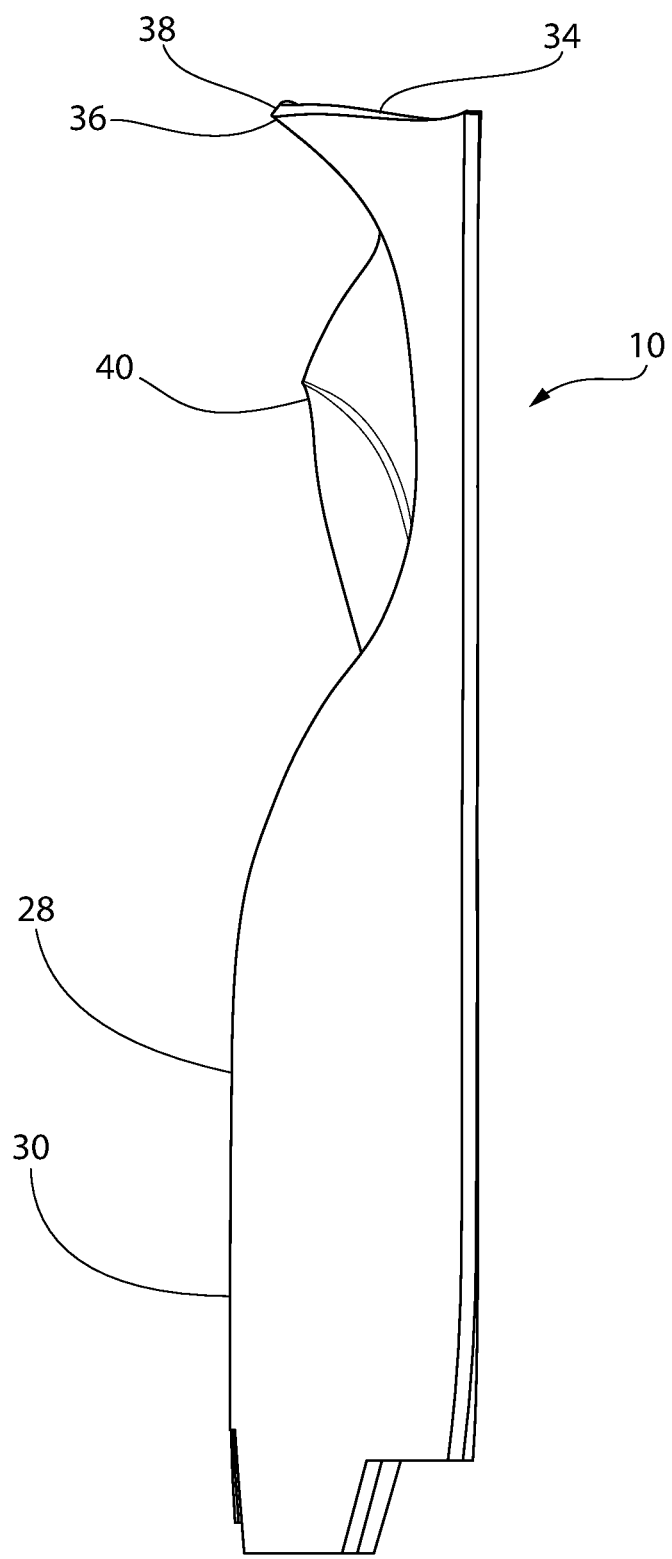
FIG. 4 is a side elevation view of a vehicle windshield in accordance with aspects of the present disclosure.
Figure 5:
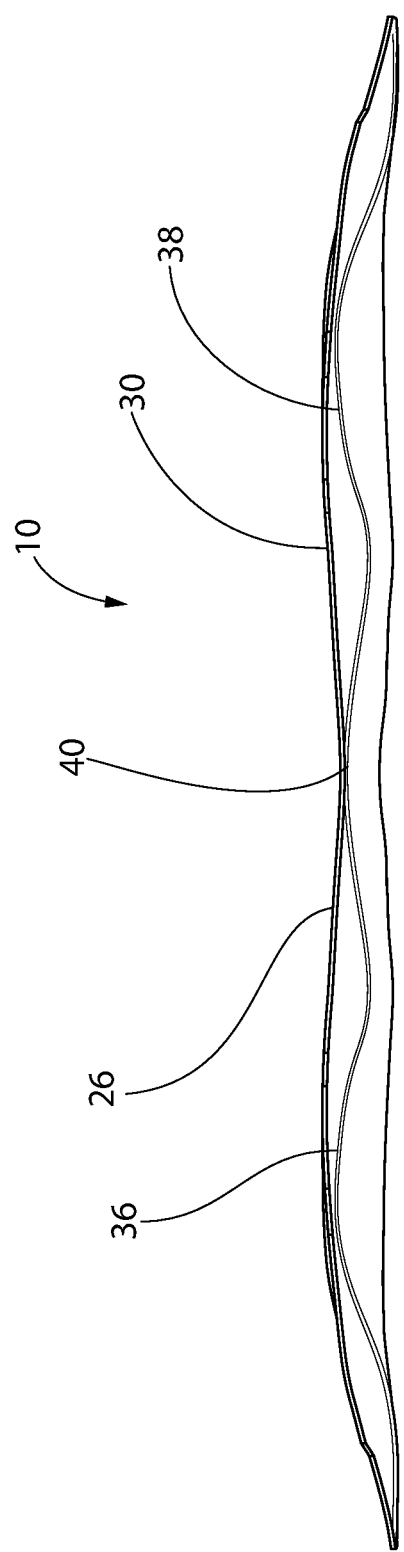
FIG. 5 is a side elevation view of a vehicle windshield in accordance with aspects of the present disclosure.

Referring now to FIGS. 2-5, the windshield 10 of an embodiment includes a right-side bulging portion 26 disposed at a right-side lower portion 28 and a left-side bulging portion 30 disposed at a left-side lower portion 32. The windshield 10 of an embodiment further includes one or more protrusion(s) disposed at an upper edge 34. In additional embodiments not illustrated, the windshield 10 includes any number of protrusions. FIG. 4 illustrates a fully transparent embodiment of the windshield 10 from a side elevation view to illustrate the various portions, areas, and edges described herein. As best shown in FIGS. 3 and 4, a right-side protrusion 36 is disposed at a right side 46 of the upper edge 34 in an embodiment. Further, a left-side protrusion 38 is disposed at a left side 48 of the upper edge 34 in an embodiment. In a further embodiment, a central protrusion 40 is disposed between the right-side protrusion 36 and the left-side protrusion 38 at a central portion of the upper edge 34. In an embodiment, the central protrusion 40 extends to a central portion 56 of the windshield 10.

The right-side bulging portion 26 includes an upper-right surface 42 angled generally from a lower-central portion 44 to the right side 46 of the upper edge 34. The left-side bulging portion 30 includes an upper-left surface 50 angled from the lower-central portion 44 to the left side 48 of the upper edge 34.

FIG. 2 illustrates the windshield 10 having a right-side depression 52 extending from the lower-central portion 44 to the right side 46 of the upper edge 34. Further, a left-side depression 54 extends from the lower-central portion 44 to the left side 48 of the upper edge 34 in an embodiment. The right-side depression 52 is disposed between the right-side protrusion 36 and the right-side bulging portion 26 in an embodiment. The left-side depression 54 is disposed between the left-side protrusion 38 and the left-side bulging portion 30 in an embodiment.

In particular embodiments, the windshield 10 is symmetrical such that a line of symmetry 58 defines a right side 60 and a left side 62 of the windshield 10. In such embodiments, the right-side depression 52 extends from a lower portion 64 of the line of symmetry 58 to the right side 46 of the upper edge 34 and the left-side depression 54 extends from the lower portion 64 of the line of symmetry 58 to the left side 48 of the upper edge 34. As illustrated in FIG. 2, the central protrusion 40 is disposed at the upper edge 34 and on the line of symmetry 58. In additional embodiments not illustrated, the windshield 10 is asymmetrical and/or does not include the line of symmetry 58.

The windshield 10 of one or more embodiments comprises a polymeric material, such as a polycarbonate material in a non-limiting example. In additional embodiments, the windshield 10 is made from a different polymeric material, an elastomeric material, and/or a glass, ceramic, metal, composite (such as fiberglass and/or carbon fiber), a natural and/or a synthetic material as recognized by one having ordinary skill in the art. The windshield 10 of the illustrated embodiments is semi-transparent and includes a tint in order to reduce glare for the vehicle operator and/or passenger. In additional embodiments, the windshield 10 is fully transparent, fully opaque, or any degree of transparency or opacity therebetween. Further, the windshield 10 may be manufactured having any one or more colors or tints in accordance with additional embodiments. Additionally, the windshield 10 may include a coating or surface treatment in one or more embodiments for application, environmental, aesthetic, and/or other purposes.

Figure 6:
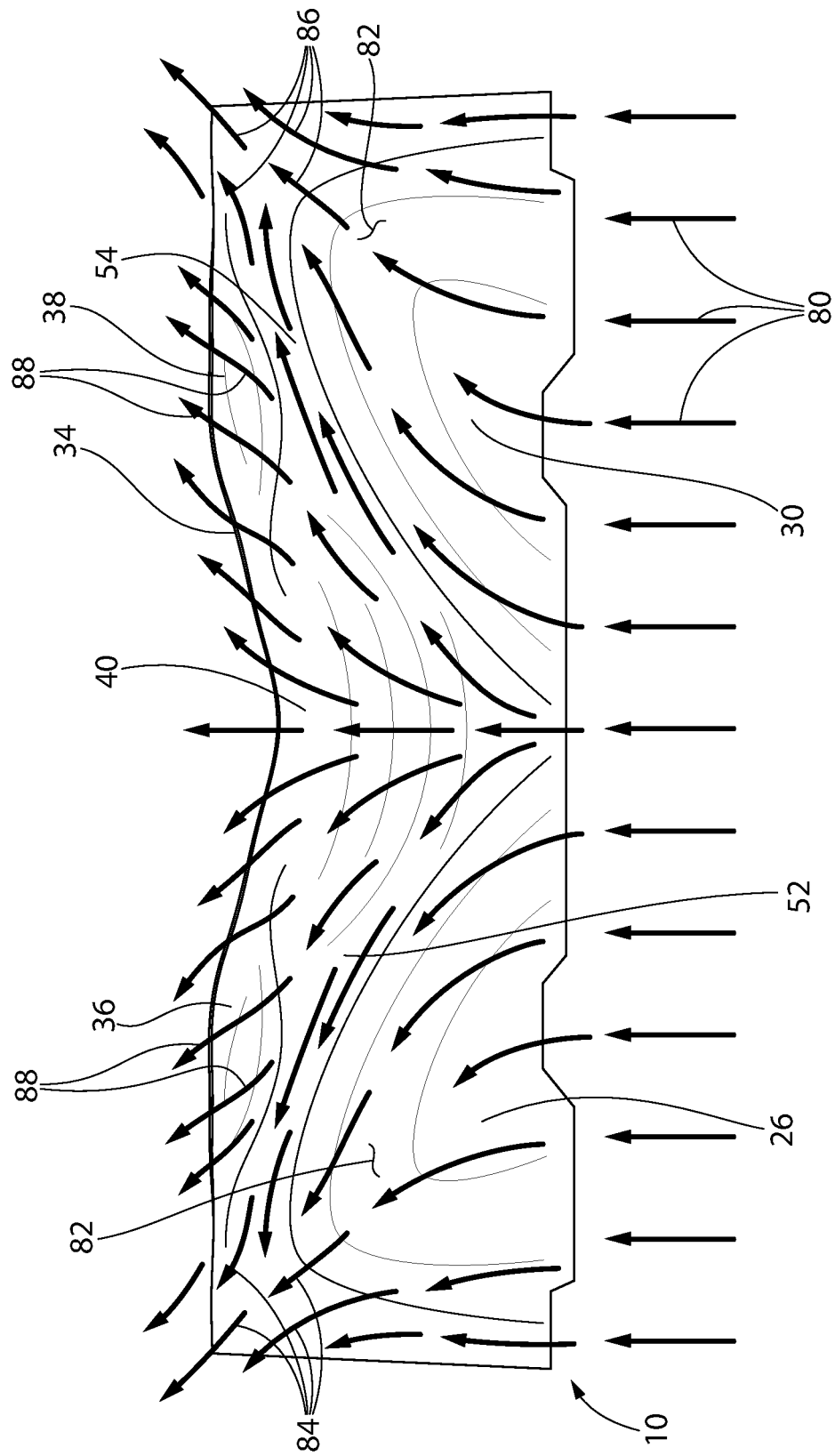
FIG. 6 illustrates a vehicle windshield in accordance with aspects of the present disclosure.

Referring now to FIG. 6, the windshield 10 is configured to direct airflow to improve and/or enhance the operator and/or passenger experience in the vehicle 12. The view of FIG. 6 is a top plan view or a view orthogonal to a plane formed by the right-side edge 20 and the left-side edge 24. FIG. 6 illustrates a simulation of airflow across the windshield 10 when the windshield 10 is mounted on the vehicle 12 as shown in FIG. 1. In the illustrated embodiment, the windshield 10 is mounted on the vehicle 12 such that the right-side edge 20 and the left-side edge 24 are angled between 45 degrees and 60 degrees relative to a horizontal plane, the plane of motion of the vehicle 12, and/or incoming airflow. In additional embodiments, the windshield 10 may be mounted at any angle between 0 and 90 relative to a horizontal plane, the plane of motion of the vehicle 12, and/or incoming airflow. As illustrated, the incoming airflow 80 impinges at different areas of the front surface 82 of the windshield 10. The right-side depression 52, the right-side protrusion 36, and/or the right-side bulging portion 26 direct the airflow 80 in a direction generally rightward, as illustrated by the arrows 84 in FIG. 6. The left-side depression 54, the left-side protrusion 38, and/or the left-side bulging portion 30 direct the airflow 80 in a direction generally leftward, as illustrated by the arrows 86 in FIG. 6. The upper edge 34, including the central protrusion 40, the right-side protrusion 36, and/or the left-side protrusion 38, further direct the airflow 80 in an upward and rearward direction, as indicated by arrows 88, to reduce turbulent flow and reduce impingement of air and debris on the vehicle operator and/or passenger. As illustrated in FIG. 6, the windshield 10 improves the ability for the operator and/or passenger(s) of the vehicle 12 to operate the vehicle and view their surroundings. The windshield 10 reduces strain on eyes, neck (s), and other body parts that are adversely affected by rain, snow, wind, sand, mud, insects, debris, and/or other elements encountered by the vehicle 10 and its occupants. The windshield 10 and vehicle 12 provide these benefits without significantly impeding the operator's and/or passenger's ability to view their surroundings and/or perform other functions while occupying the vehicle 12. Further, it will be recognized that the windshield 10 and the vehicle 12 of one or more of the present embodiments allows the driver and/or the passenger to view surroundings by looking over, rather than through, the windshield 10. In additional embodiments, the driver and/or the passenger are able to view surroundings by looking through the windshield 10.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

We claim:

1. A windshield for attachment to a vehicle having a passenger compartment, the windshield comprising:
   a front surface defining a front surface plane;
   a rearward surface opposite the front surface defining a rearward surface plan; and
   an upper edge;
   wherein the front surface plane and the rearward surface plane extend from a right-side edge to a left-side edge; and
   at least one protrusion in said windshield disposed at said upper edge extending frontally, away from the first surface plane, such that the front surface plane is convex and the rearward surface plane is concave.

2. The windshield of claim 1, wherein the at least one protrusion comprises a right-side protrusion disposed at a right side of the upper edge.

3. The windshield of claim 2, wherein the at least one protrusion further comprises a left-side protrusion disposed at a left side of the upper edge.

4. The windshield of claim 3, further comprising at least one fastener.

5. The windshield of claim 1, further comprising at least one right side fastener.

6. The windshield of claim 1, further comprising at least one left side fastener.

7. The windshield of claim 1, further comprising:
at least one right-side attachment portion disposed at a right-side edge and configured to attach the windshield to the vehicle; and
at least one left-side attachment portion disposed at a left-side edge and configured to attach the windshield to the vehicle.

8. A vehicle having a passenger compartment comprising:
a windshield comprising:
 a front surface defining a front surface plane;
 a rearward surface opposite the front surface defining a rearward surface plane; and
 an upper edge
  wherein the front surface place and the rearward surface plane extend from a right-side edge to a left-side edge; and
at least one protrusion in said windshield disposed at said upper edge extending frontally, away from the first surface plane, such that the front surface plane is convex and the rearward surface plane is concave.

9. The vehicle of claim 8,
wherein the windshield further comprises at least one fastener disposed at least one edge of the windshield and configured to attach the windshield to the vehicle.

10. The vehicle of claim 8, wherein the at least one protrusion comprises a right-side protrusion disposed at the upper edge.

11. The vehicle of claim 10, wherein the at least one protrusion further comprises a left-side protrusion disposed at the upper edge.

12. The vehicle of claim 8, wherein the windshield further comprises a right-side depression extending from a lower-central portion to a right side of an upper edge.

13. The vehicle of claim 12, wherein the windshield further comprises a left-side depression extending from the lower-central portion to a left side of the upper edge.

14. The vehicle of claim 9, wherein the at least one fastener comprises at least one right side fastener disposed at a right-side edge of the windshield and configured to attach the windshield to the vehicle.

15. The vehicle of claim 9, wherein the at least one fastener comprises at least one left side fastener disposed at a left-side edge of the windshield and configured to attach the windshield to the vehicle.

16. The vehicle of claim 8, wherein the windshield further comprises trim or molding on at least one edge.

17. The windshield of claim 1, wherein the windshield further comprises trim or molding on at least one edge.

18. The windshield of claim 1, wherein the windshield further comprises a line of symmetry defining a right side and a left side.

19. The windshield of claim 8, wherein the windshield further comprises a line of symmetry defining a right side and a left side.

* * * * *